United States Patent Office 3,133,973
Patented May 19, 1964

3,133,973
PREPARATION OF ISOMERIC-1:4
CYCLOHEXANEDIMETHANOL
Peter Smith and Anthony Howden Jubb, both of Norton-on-Tees, England, assignors to Imperial Chemical Industries Limited, London, England, a corporation of Great Britain
No Drawing. Filed Mar. 17, 1961, Ser. No. 96,389
Claims priority, application Great Britain Mar. 24, 1960
4 Claims. (Cl. 260—617)

This invention relates to isomerisation processes.

Cis- and trans-isomers of organic cyclic compounds are often interconvertible, the equilibrium proportions of the two isomers at normal conditions often showing a preponderance of one isomer. Frequently this isomer is preferable to the other for use in many processes. Nevertheless, many preparative methods which are otherwise very convenient for making these compounds yield a high proportion of the less desirable isomer in the product.

For example in the manufacture of linear fibre-forming polyesters from terephthalic acid and 1:4-cyclohexanedimethanol, it is the use of trans-isomer of the latter compound which permits the formation of polyesters having higher melting points than when the cis-isomer is used. Such polyesters are disclosed in British patent specification 818,157. In United States patent specification 2,917,549 it is stated that the compound, 1:4-cyclohexanedimethanol is prepared commercially by the hydrogenation of an ester of 1:4-cyclohexanedicarboxylic acid. This specification, relates to the isomerisation of cis-1:4-cyclohexanedimethanol to the trans-isomer in the presence of certain alkoxides.

We have now found that the isomerisation to the preferred trans-isomer can readily be effected to a precursor of the 1:4-cyclohexanedimethanol. We prefer to isomerise the cis-isomer either alone or in admixture with the trans-isomer to the trans-form when in the form of an ester of 1:4 cyclohexanedicarboxylic acid. Isomerisation of such compounds takes place readily at normal or superatmospheric pressures at temperatures of about 280° C. to about 400° C. and advantageously as compared with the process of United States specification 2,917,549 in the absence of catalyst, although a catalyst to assist the isomerisation may be used, if desired. The products of the isomerisation can readily be converted to 1:4-cyclohexanedimethanol by treatment with hydrogen, in the presence of a hydrogenation catalyst, such as copper chromite without any substantial effect on the proportions of the cis- and trans-isomers.

Thus according to the present invention we provide a process for the preparation of 1:4-cyclohexanedimethanol containing the trans-isomer in a percentage in excess of the percentage of the trans-isomer present in the dialkylester of 1:4-cyclohexanedicarboxylic acid from which it is obtained by heating this diester in its cis-isomeric form, either alone or in admixture with a minor amount of its trans-isomer at a temperature of at least 250° C. and converting the reaction product into 1:4-cyclohexanedimethanol.

We prefer to heat the cis-isomeric dimethyl ester of 1:4-cyclohexanedicarboxylic acid at a temperature within the range 280–400° C. and this may take place either at atmospheric or superatmospheric pressures, but any dialkyl ester may also be used.

A feature of this invention is that since the process may be carried out by heating the compound alone, no subsequent extraction or separation steps from solvent or catalytic material are necessary, apart from separating the isomers if this is required. In many cases even this is unnecessary, since frequently only minor amounts of the unwanted isomer remain after treatment according to the present invention. For example in the manufacture of the polyester commercially derived from terephthalic acid and 1:4-cyclohexanedimethanol, a fibre forming polyester can be obtained which contains glycol residues in both the trans- and cis-isomeric forms but in which the trans-form predominates. The dialkyl ester of 1:4-cyclohexanedicarboxylic acid to be isomerised should comprise at least a substantial proportion of its cis-isomer, while the corresponding trans-isomer may of course be substantially absent.

The following examples in which all parts and percentages are by weight, illustrate but do not limit the scope of our invention.

In the following examples, 10 gms. of dimethyl hexahydroterephthalate comprising 76% cis- and 24% trans-isomer by weight was heated in a tube immersed in a liquid metal bath. The heating time and temperature of the bath, together with yields of trans-isomer which were obtained by infra-red spectroscopic analysis of the product, are given in the accompanying table. In all cases the only other material found in the product was the cis-isomer. The product of each example was converted by treatment with hydrogen in the presence of copper chromite catalyst to yield 1:4-cyclohexanedimethanol, the analysis of which in each case showed that the proportions of cis- and trans-isomers was substantially unaffected by the conversion.

| Example | Bath temp., ° C. | Heating time, hrs. | Percent trans-isomer |
|---|---|---|---|
| 1 (Open tube) | 300 | ¾ | 28 |
| 2 | 300 | 2 | 35 |
| 3 | 300 | 4 | 45 |
| 4 | 300 | 6 | 52 |
| 5 | 300 | 8 | 59 |
| 6 | 300 | 22 | 74 |
| 7 (Sealed tube) | 280 | 2 | 35 |
| 8 | 280 | 4½ | 37 |
| 9 | 280 | 6 | 43 |
| 10 | 300 | 2 | 43 |
| 11 | 300 | 6 | 57 |
| 12 | 320 | 2 | 53 |
| 13 | 340 | 1 | 52 |
| 14 | 360 | 7/12 | 60 |
| 15 | 360 | 2 | 66 |
| 16 | 360 | 6 | 67 |

*Example 17*

Dimethyl cis-hexahydroterephthalate was heated in an open vessel under reflux conditions at 300° C. for 6 hours. The product was a mixture of the dimethyl esters of cis and trans hexahydroterephthalates containing 22% of the trans-isomer.

*Example 18*

Dimethyl cis-hexahydroterephthalate was heated in a sealed vessel for 1 hour at 360° C. The product was a mixture of the dimethyl esters of cis and trans-hexahydroterephthalates containing 42% of the trans-isomer.

*Example 19*

Dimethyl cis-hexahydroterephthalate was heated in a sealed vessel for 16 hours at 360° C. The product was a mixture of the dimethyl esters of cis- and trans-hexahydroterephthalates containing 74% of the trans-isomer.

In Examples 17, 18 and 19 the reaction products were converted to 1:4-cyclohexanedimethanol in a similar manner to that used in Example 1–16 without any substantial change in the ratio of the trans- to cis-isomers.

Although the process has been exemplified by means of simple batch experiments, it will be obvious to those skilled in this art, that any dimethyl ester of cis-hexahydroterephthalates remaining after isomerisation has taken place can readily be recycled if desired to a further isomerisation treatment before conversion into 1:4-cyclohexanedimethanol.

What we claim is:

1. A process for the preparation of 1:4-cyclohexanedimethanol containing the trans-isomer in a percentage in excess of the percentage of the trans-isomer present in a starting dialkyl ester of 1:4-cyclohexanedicarboxylic acid, which comprises the steps of heating alone a member of the group consisting of said dialkyl diester in its cis-isomeric form, and mixtures thereof with a minor amount of the trans-isomer of said dialkyl ester at a temperature of at least 250° C. and hydrogenating the reaction product to convert it to 1:4-cyclohexanedimethanol.

2. A process according to claim 1 wherein the dialkyl ester of 1:4-cyclohexanedicarboxylic acid is the dimethyl ester.

3. A process according to claim 2 wherein the isomerization takes place at a temperature within the range of 280–400° C.

4. A process according to claim 1 wherein the isomerization takes place under superatmospheric pressure conditions.

References Cited in the file of this patent

UNITED STATES PATENTS 2,917,549     Hasek et al. _____ Dec. 15, 1959